(12) United States Patent
Herrmann et al.

(10) Patent No.: US 7,249,645 B2
(45) Date of Patent: Jul. 31, 2007

(54) INDUSTRIAL TRUCK WITH A LATERAL FRAME OPENING AND A DOOR WITH A DOUBLE HINGE

(75) Inventors: Udo Herrmann, Johannesberg (DE); Jürgen Horn, Grosswallstadt (DE)

(73) Assignee: Linde Aktiengesellschaft, Wiesbaden (DE)

( * ) Notice: Subject to any disclaimer, the term of this patent is extended or adjusted under 35 U.S.C. 154(b) by 39 days.

(21) Appl. No.: 10/941,642

(22) Filed: Sep. 15, 2004

(65) Prior Publication Data

US 2005/0093337 A1 May 5, 2005

(30) Foreign Application Priority Data

Sep. 16, 2003 (DE) ................. 103 42 659

(51) Int. Cl.
*B60R 16/04* (2006.01)
(52) U.S. Cl. ................. 180/68.5; 296/146.11; 296/146.12
(58) Field of Classification Search ............... 180/68.5, 180/908, 65.1–65.2; 296/190.11, 146.11–146.12
See application file for complete search history.

(56) References Cited

U.S. PATENT DOCUMENTS

| | | | | | |
|---|---|---|---|---|---|
| 446,817 | A | * | 2/1891 | Hunter | .......... 105/51 |
| 1,734,645 | A | * | 11/1929 | Polland | ............ 180/68.5 |
| 2,709,494 | A | * | 5/1955 | Luce | ............ 180/68.5 |
| 3,558,184 | A | * | 1/1971 | Plegat | ............ 296/146.11 |
| 3,930,552 | A | * | 1/1976 | Kunkle et al. | ............ 180/68.5 |
| 4,133,574 | A | * | 1/1979 | Martin | ............ 296/190.09 |
| 5,282,293 | A | * | 2/1994 | Pedoeem | ............ 16/342 |
| 6,550,845 | B1 | * | 4/2003 | Pietryga | ............ 296/146.1 |
| 6,637,807 | B2 | * | 10/2003 | Gotz | ............ 296/203.01 |
| 6,842,945 | B2 | * | 1/2005 | Hiramatsu | ............ 16/366 |
| 2003/0067188 | A1 | * | 4/2003 | Go | ............ 296/146.11 |
| 2003/0070860 | A1 | | 4/2003 | Gotz | |

FOREIGN PATENT DOCUMENTS

| | | |
|---|---|---|
| GB | 1032000 | 6/1966 |
| GB | 2 049 799 A | 12/1980 |
| JP | 11-254972 | 9/1999 |

\* cited by examiner

*Primary Examiner*—Christopher P. Ellis
*Assistant Examiner*—Vaughn Coolman
(74) *Attorney, Agent, or Firm*—The Webb Law Firm (57) ABSTRACT

An industrial truck has a vehicle frame (1) with a frame portion (2) having a lateral frame opening (2b) for receiving a battery block. A door (3) covers the frame opening (2b) and may be pivoted outwardly about a substantially vertical axis of rotation (A1). To allow the door (3) to be opened approximately 180°, the door (3) is connected to the vehicle frame (1) by a double hinge (5). A second axis of rotation (A2) is set apart and parallel to the first axis of rotation (A1) and is alterable in its position when the door (3) pivots about the first axis of rotation (A1). A device for obstructing a rotational motion of the door (3) about the second axis of rotation (A2) can be provided, which device can be active in the pivoting range between the closed position and an open position that is approximately at right angles.

6 Claims, 10 Drawing Sheets

INDUSTRIAL TRUCK WITH A LATERAL FRAME OPENING AND A DOOR WITH A DOUBLE HINGE

CROSS REFERENCE TO RELATED APPLICATION

This application claims priority to German Application No. 103 42 659.0 filed Sep. 16, 2003, which is herein incorporated by reference in its entirety.

BACKGROUND OF THE INVENTION

1. Field of the Invention

The invention relates to an industrial truck, such as a counterweight fork-lift truck, having a vehicle frame comprising a frame portion with a lateral frame opening configured for receiving a battery block. A door is provided for covering the frame opening. The door can be pivoted outwardly about a substantially vertical axis of rotation.

2. Technical Considerations

DE 101 45 991 A1 discloses a generic industrial truck. In order to remove the battery block from the side of the truck, the door is opened and the battery block is withdrawn laterally, such as by a crane with a loading gear. It is installed in the reverse order. If the door is in an open position that is at right angles to the closed position, it can help to insert the battery block suspended from the loading gear.

If the battery block is to be installed or removed by the fork prongs of a second fork-lift truck, it is important that this second fork-lift truck moves as close as possible with its fork bracket, to which the fork prongs are attached, to the side wall of the first vehicle frame. A door in a 90° open position is an impediment here. The door can only be pivoted beyond 90° to a 180° open position if the rear-side counterweight does not protrude laterally. Otherwise, the door can strike the counterweight prematurely and thus obstruct a laterally approaching second fork-lift truck.

Therefore, it is an object of the invention to provide an industrial truck of the general type described above but that allows the door provided for the lateral frame opening to be opened by approximately 180°.

SUMMARY OF THE INVENTION

According to the invention, this object can be achieved in that the door is connected to the vehicle frame by a double hinge. This provides a second axis of rotation set apart and parallel to the first axis of rotation and alterable in its position when the door pivots about the first axis of rotation.

The invention uses a double hinge, instead of the single hinge that has been used in the past, to attach the door to the vehicle frame.

A double hinge allows the door to pivot in a pivoting range between the closed position and an open position that is approximately at right angles about the first axis of rotation and, in the pivoting range beyond this, about a second axis of rotation. The position of the second axis of rotation allows the door to be opened to an angle of 180°, even if the counterweight protrudes laterally. In other words, the position of the second axis of rotation, set apart from the first axis of rotation, can prevent the door from colliding with the counterweight (or other laterally protruding components) of the industrial truck.

According to an advantageous development of the invention, it is proposed that the first axis of rotation is arranged within the vehicle contour. When closed, the door is thus fitted flush with the lateral vehicle contour, i.e., it does not protrude laterally.

If means for obstructing a rotational motion of the door about the second axis of rotation are provided, which means are active in the pivoting range between the closed position and an open position that is approximately at right angles, there is a defined course of motion when the door is opened and closed.

When the door is opened, it is initially pivoted about the first axis of rotation, wherein the position of the second axis of rotation changes. When the door pivots beyond 90°, this takes place solely about the second axis of rotation. In principle, a different sequence of the course of motion is also possible, i.e., the door pivots first about the second axis of rotation, then about the first axis of rotation.

According to one configuration of the invention, the means for obstructing the rotational motion about the second axis of rotation can comprise a locking rod, by means of which a rigid connection can be produced between the door and the portion of the double hinge that is delimited by the two axes of rotation.

The locking rod, which between the closed position and the 90° open position of the door ensures that the door cannot pivot about the second axis of rotation, can be disengaged (in the simplest case, manually) in the 90° open position. In this position, the second axis of rotation is located outside the vehicle contour. The door can now be pivoted farther to the 180° open position, wherein the door pivots about the second axis of rotation.

According to a further advantageous configuration of the invention, the means for obstructing the rotational motion about the second axis of rotation can comprise a cam control device, which can be incorporated into the double hinge.

The obstructing and releasing process therefore takes place automatically when the door pivots. No particular manual intervention is required, as is the case when a locking rod is used. When the door is opened, the second axis of rotation is initially obstructed, and it is only released, owing to the design of the cams, when the 90° open position is reached.

A defined course of motion, when opening and closing the door, can also be obtained by providing means for generating simultaneous, coordinated pivoting movements of the door about both axes of rotation.

These means can comprise a gear unit incorporated into the double hinge, such as a star wheel gear, for example.

In one development of the invention, the double hinge comprises a device for guiding the battery block, which device can be oriented at right angles to the lateral vehicle contour when the door is in a 180° open position.

This allows the battery block of the industrial truck according to the invention to be installed and/or removed in a wide variety of ways. If a crane with a loading gear is available, the double hinge can optionally help to insert the battery block suspended from the loading gear. If a second fork-lift truck is provided for changing the battery (because a crane with a loading gear is not available), this second fork-lift truck is able, as a result of the door being in a 180° open position, to move relatively close to the lateral vehicle contour of the fork-lift truck according to the invention because the guiding device, which protrudes at right angles, is substantially shorter than a door provided for guiding purposes that also protrudes at right angles (90° open position).

Although the door, in this embodiment of the invention, has only a single open position, namely a 180° open position, the guiding device that is incorporated into the double hinge provides a means for helping to insert the battery block.

In the operating position, the guiding device is expediently supported on the vehicle frame by an articulated brace. A damping device can be incorporated into the articulated brace.

It can be advantageous, in a development of the invention, if the door and the double hinge are constructed so as to reinforce the frame and can be locked in the closed position by a force-transmitting locking unit.

In the closed position, the door then acts as part of the vehicle frame, provided that the relevant elements (e.g., the door, the double hinge and the locking unit) are sufficiently stable in their construction. Owing to the frame-reinforcing function of the door and the double hinge, the vehicle frame can be provided with a plurality of frame openings, which may also merge with one another. Nevertheless, when the door is closed, the vehicle frame of the industrial truck according to the invention hardly deforms.

In conjunction with the use of the door and the double hinge as elements for reinforcing the frame, the devices that are provided for obtaining a specific course of motion when opening and closing the door, such as the locking rod, for example, serve to prevent buckling when the door is closed.

In their capacity as frame-reinforcing components, the door, the locking unit, and the double hinge absorb at least tractive and compressive forces. Advantageously, torsional forces are also absorbed.

A further configuration of the invention provides that, viewed in the direction of travel, the door is attached to the back of the vehicle frame. In principle, however, it is also possible to attach the door to the front.

If means for locking the battery block in the lateral direction are provided on the vehicle frame, the door, the double hinge, and the locking unit are not subjected to inertial forces acting in the transverse direction of the battery block.

BRIEF DESCRIPTION OF THE DRAWINGS

Further advantages and details of the invention will be described in greater detail with reference to the embodiment illustrated in the schematic figures, in which.

DESCRIPTION OF THE PREFERRED EMBODIMENTS

The exemplary industrial truck shown in the drawings is configured as a counterweight fork-lift truck, which comprises a vehicle frame 1 with a rear-side counterweight G (the counterweight G can be part of the vehicle frame 1 or can be suspended therefrom). A central frame portion 2, which is configured to receive a battery block (not shown in the figures), is located upstream of the counterweight G, in the direction of travel.

In order to allow the battery block to be installed and removed, the frame portion 2 has an upper frame opening 2*a* and a lateral frame opening 2*b*. The battery block can be removed upwardly out of the frame opening 2*a* by a crane with a loading gear. Alternatively, the battery block can be installed and/or removed laterally through the frame opening 2*b*, with the loading gear suspended from the crane.

A lower frame opening 2*c* adjoins the lateral frame opening 2*b*. The lower frame opening 2*c* allows the fork prongs of a second industrial truck to travel underneath the battery block located in the industrial truck and move it laterally out of the central frame portion 2 of the vehicle frame 1.

The lateral frame opening 2*b* can be closed by a door 3, which is shown in the illustrated embodiment as an open profile construction without cladding. A closed configuration, i.e., a profile construction with a sheet metal or plastics material cladding or a sheet metal shell construction with incorporated reinforcement profiles, is, however, preferred.

In the closed position, the door 3 can be brought into active engagement with a locking unit 4. The door 3 is attached to the vehicle frame 1 (or the counterweight G) by means of a double hinge 5, which in the present embodiment is arranged in the region of transition from the counterweight G to the central frame portion 2. Viewed in the direction of travel of the truck, the door 3 is thus attached to the back of the opening. It is, however, in principle also possible to attach the door to the front, if this appears expedient.

The double hinge 5 has two vertical axes of rotation A1 and A2, set apart and parallel to each other. A first axis of rotation A1 is fixed relative to the frame or counterweight, and can be located within the lateral vehicle contour, i.e., in the present case, in a recess in the vehicle frame 1 or the counterweight G that is displaced, with respect to the lateral delimitation of the counterweight G, toward the vehicle longitudinal central plane.

Figure 2:
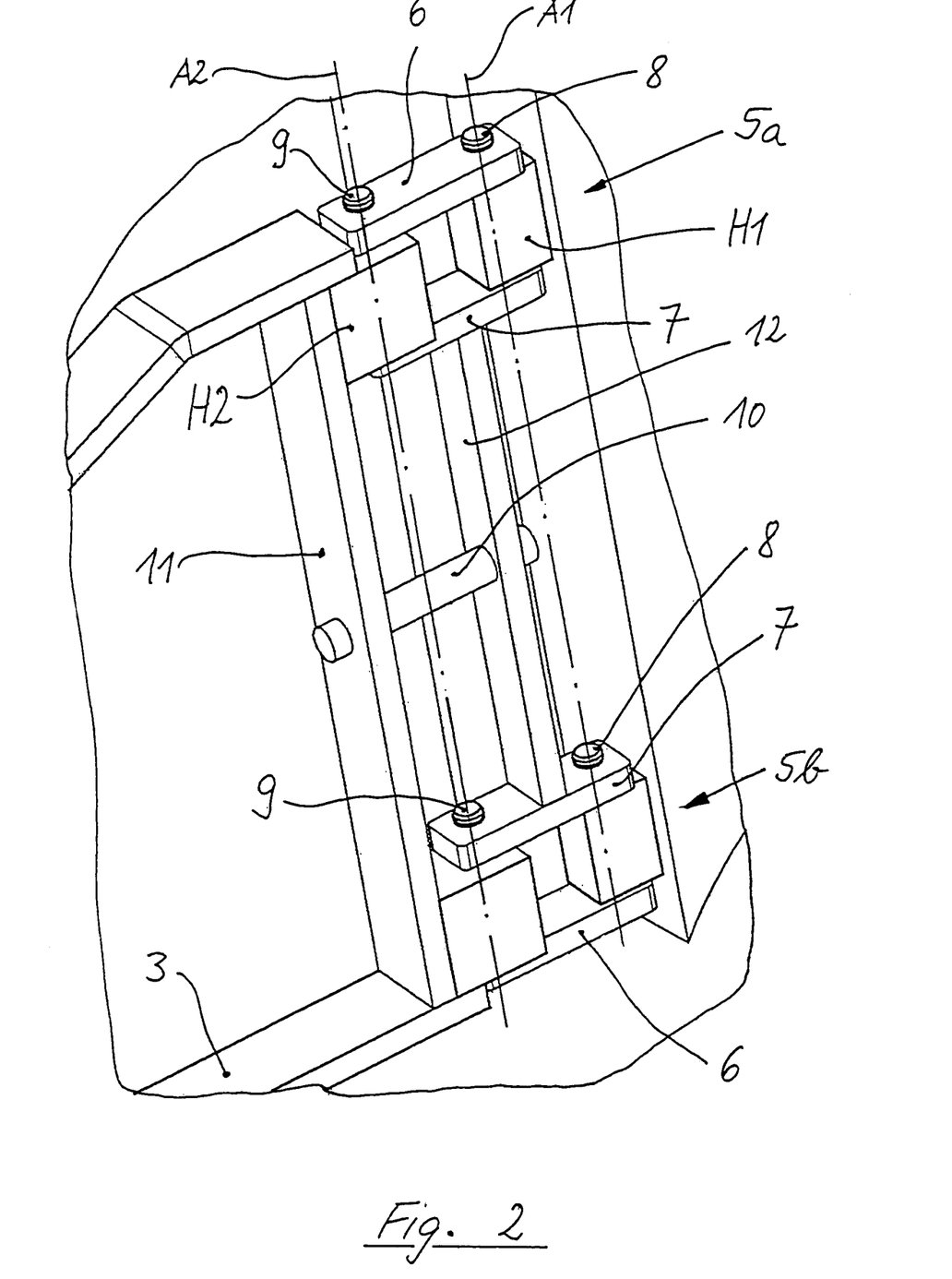
FIG. 2 shows an enlarged view of the double hinge in FIG. 1, in the closed position.

The construction of the double hinge 5 may be seen in FIG. 2. The double hinge 5 comprises upper and lower hinge elements 5*a* and 5*b*, respectively, each of which comprises an outer hinge frame 6, an inner hinge frame 7, and two hinge pins 8 and 9. The first axis of rotation A1 extends through the hinge pins 8, while the second axis of rotation extends through the hinge pins 9.

The two hinge pins 8 are attached to the vehicle frame 1 or the counterweight G by brackets H1 (top and bottom).

The hinge pins 9 are located in brackets H2 (top and bottom) of the door 3. In order to obtain a defined course of motion when opening and closing the door, it can be beneficial to obstruct the second axis of rotation A2 occasionally.

For this purpose, a locking rod 10 can be provided, with which the door 3 can be fixed relative to the portion of the double hinge 5 that is enclosed between the axes of rotation A1 and A2. The locking rod 10 penetrates a vertical brace 11 of the door 3, in the horizontal direction, and a vertical brace 12, connecting the inner hinge frames 7 of the two hinge elements 5a and 5b of the double hinge 5.

Figure 3:
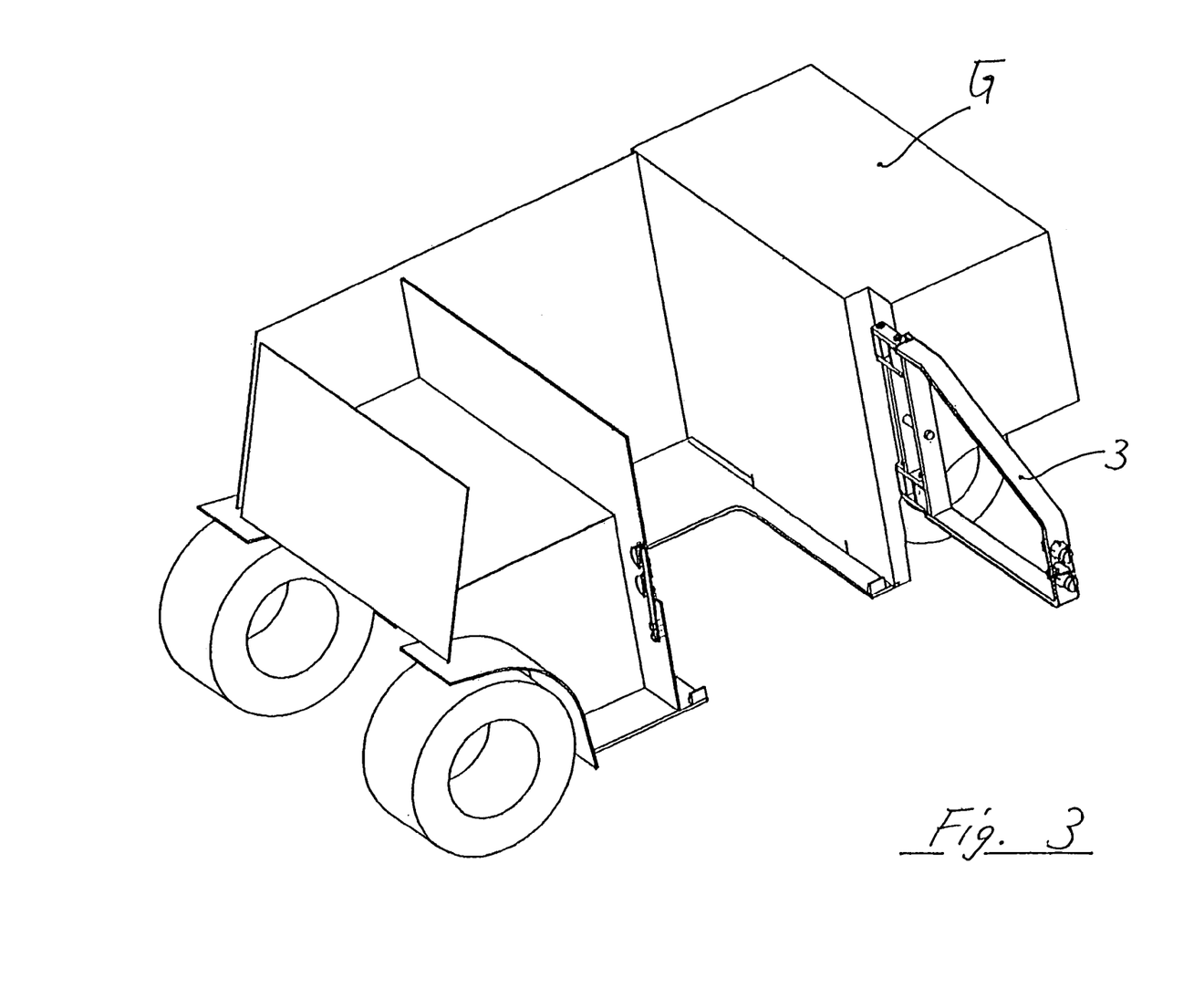
FIG. 3 shows a perspective view of an industrial truck of the invention, with the door in the 90° open position.
Figure 4:
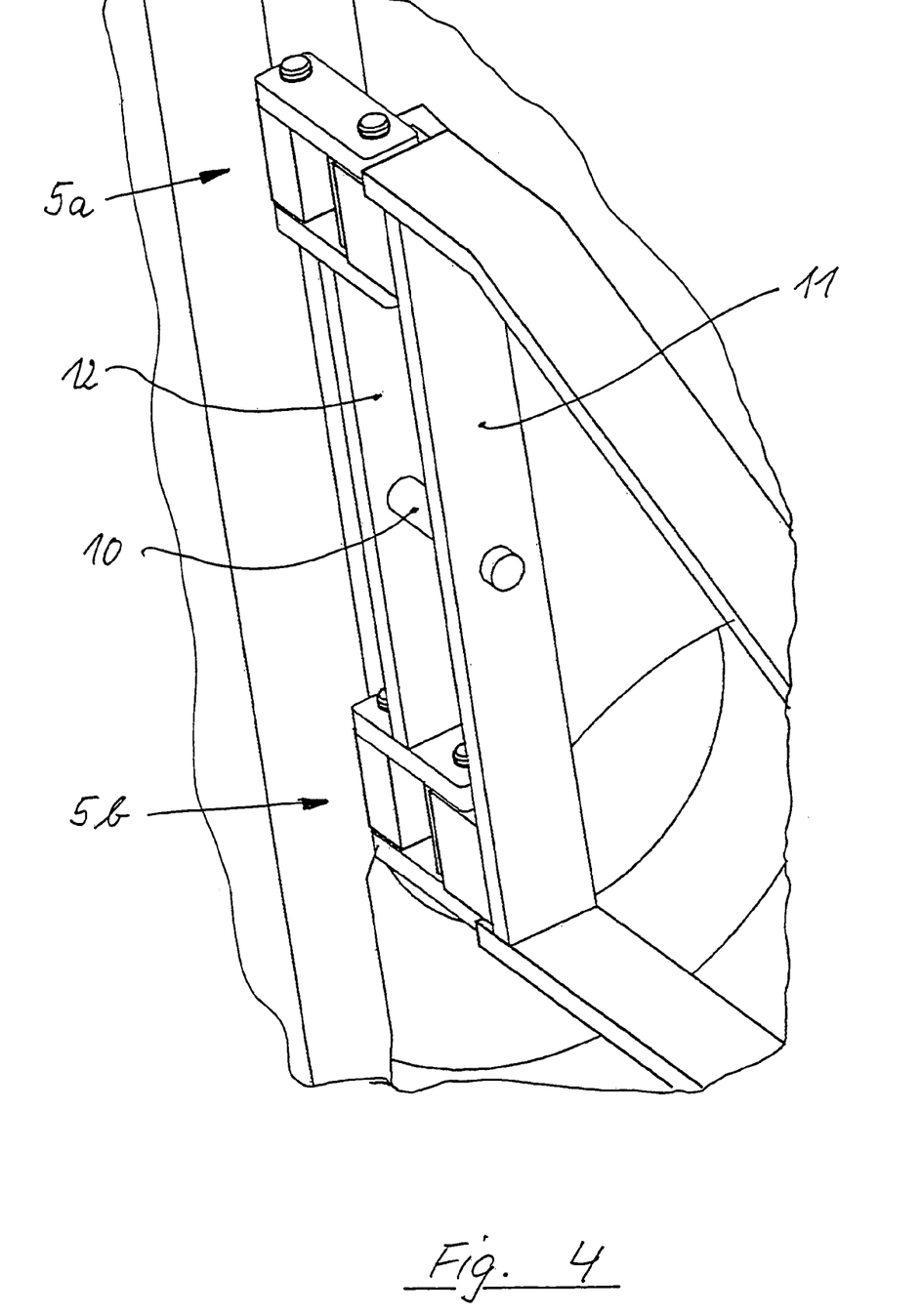
FIG. 4 shows an enlarged view of the double hinge in FIG. 3, with the door in the 90° open position.

Accordingly, when the locking rod 10 is engaged, the door can be pivoted only about the first axis of rotation A1. The first axis of rotation A1 remains constantly fixed relative to the frame, while the second axis of rotation A2 varies its position and, when the door is in the 90° open position (see FIGS. 3 and 4), for example, it is located outside the lateral vehicle contour.

Figure 5:
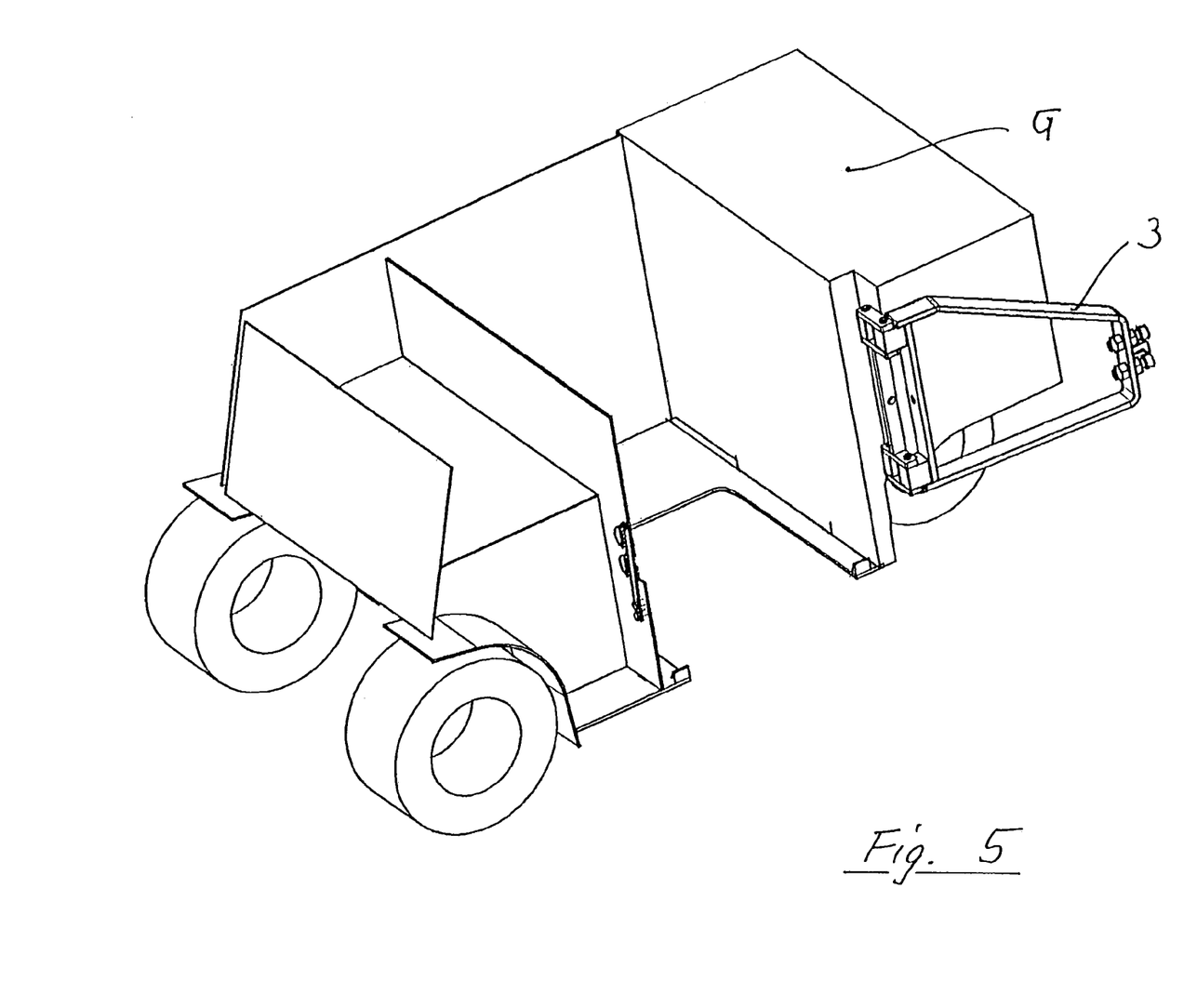
FIG. 5 shows a perspective view of an industrial truck of the invention, with the door in the 180° open position.
Figure 6:
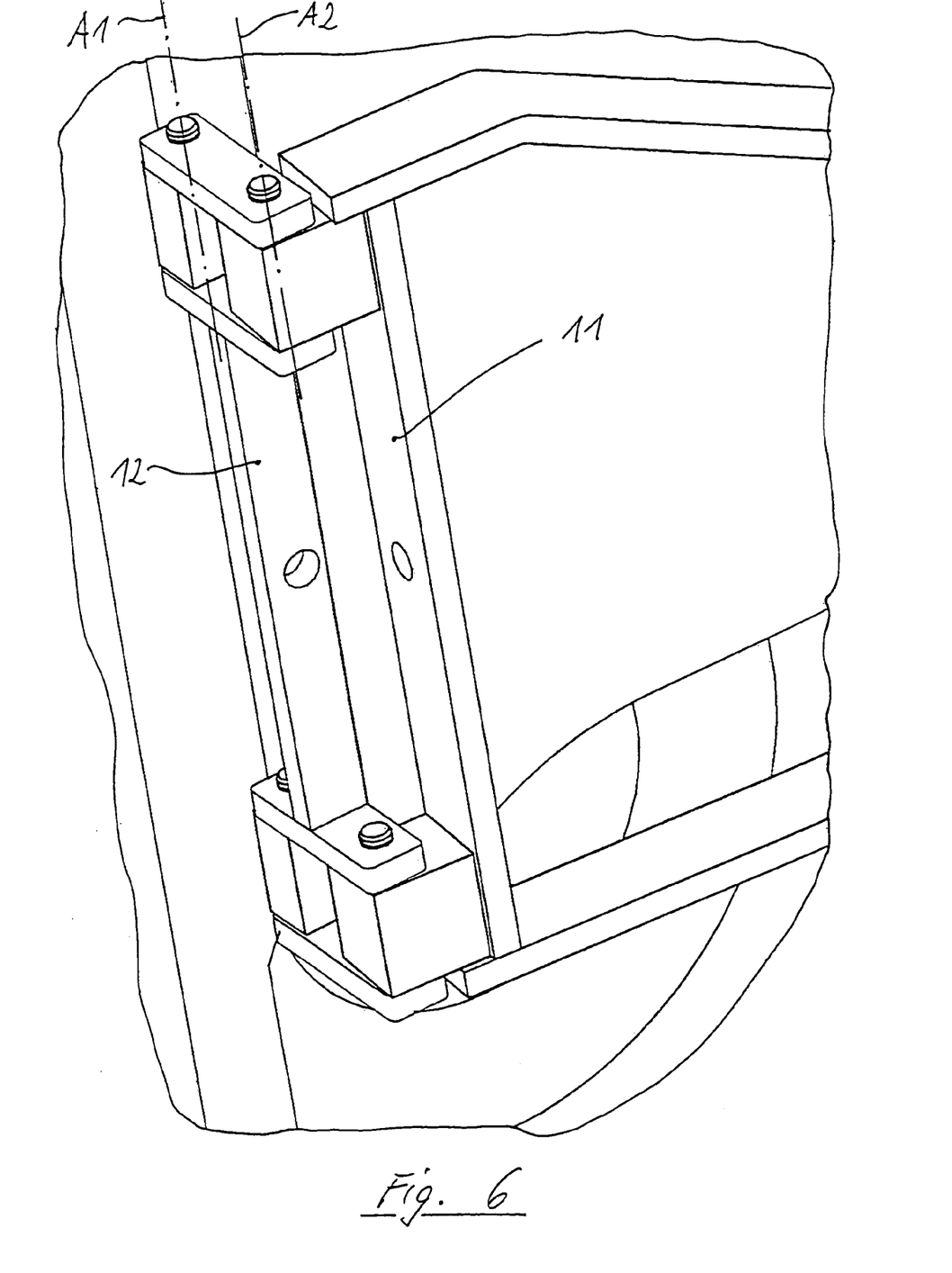
FIG. 6 shows an enlarged view of the double hinge in FIG. 5, with the door in the 180° open position.

Only when the locking rod 10 is removed, or at least disengaged, may the door 3 be pivoted about the second axis of rotation A2, allowing the door 3 to be opened beyond 90°, for example to 180° (see FIGS. 5 and 6), without the door 3 prematurely striking the counterweight G.

Figure 7:
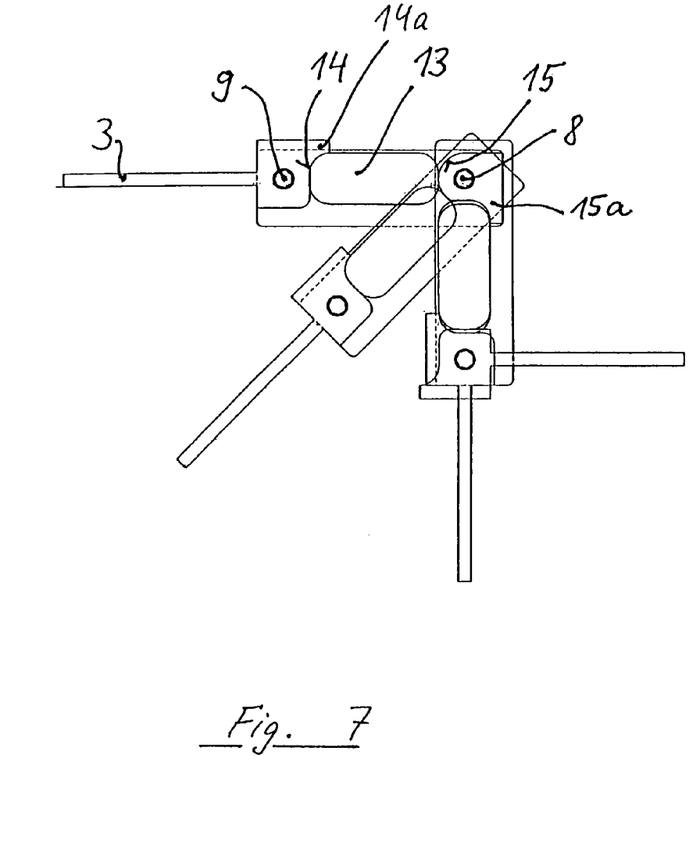
FIG. 7 shows a plan view of a double hinge with a cam control device.
Figures 8, 9:
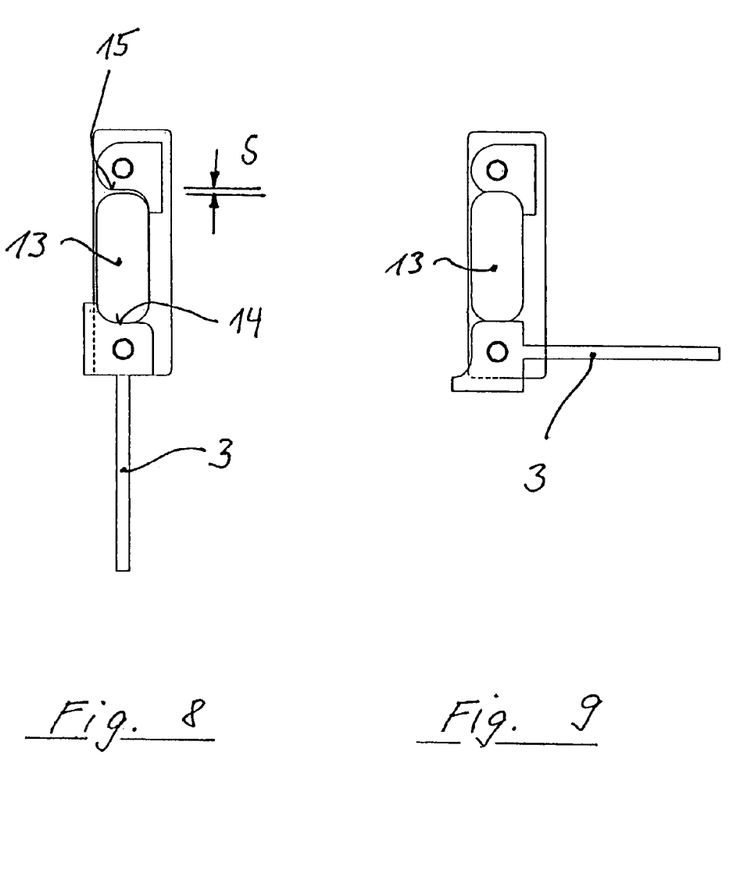
FIG. 8 shows a plan view of the double hinge according to FIG. 7, with the door in the 90° open position.
FIG. 9 shows a plan view of the double hinge according to FIG. 7, with the door in the 180° open position.

As an alternative to the locking rod 10, it is also possible to incorporate a cam control device into the double hinge 5 (see FIGS. 7, 8, and 9). In this case, a longitudinally movable cam body 13 is arranged between a cam track 14 and a cam track 15. The cam track 14 is attached to the door 3, e.g., to the bracket(s) H1 (FIG. 2), and can comprise a moulded-on entraining element 14a. The cam track 15 is located on the vehicle frame 1, on the bracket(s) H2, for example, and can comprise a moulded-on stop 15a.

When the door 3 is in the closed position, the cam body 13 abuts both cam tracks 14 and 15, substantially free from clearance. When it is opened, the door 3, which is guided by the entraining element 14a and by the design of the cam track 14 and the cam body 13 (freedom from clearance), performs a pivoting movement only about the first axis of rotation A1 (hinge pins 8), but not about the second axis of rotation A2 (hinge pins 9). The cam body 13 travels along the cam track 15 of the double hinge 5 (see FIG. 7), up to the stop 15a of the cam track 15.

When the door 3 is in the 90° open position (see FIG. 8), there is sufficient clearance (S) between the cam body 13 and the cam track 15 to allow the door 3 to be pivoted farther about the second axis of rotation A2 (see FIG. 3), the cam body 13 being pressed from the rotating cam track 14 toward the cam track 15.

Instead of the cam device for controlling the defined course of motion when opening and closing the door 3, it is also possible to use a gear unit that is incorporated into the double hinge (shown in FIGS. 10 to 14 as a star wheel gear).

Figure 10:
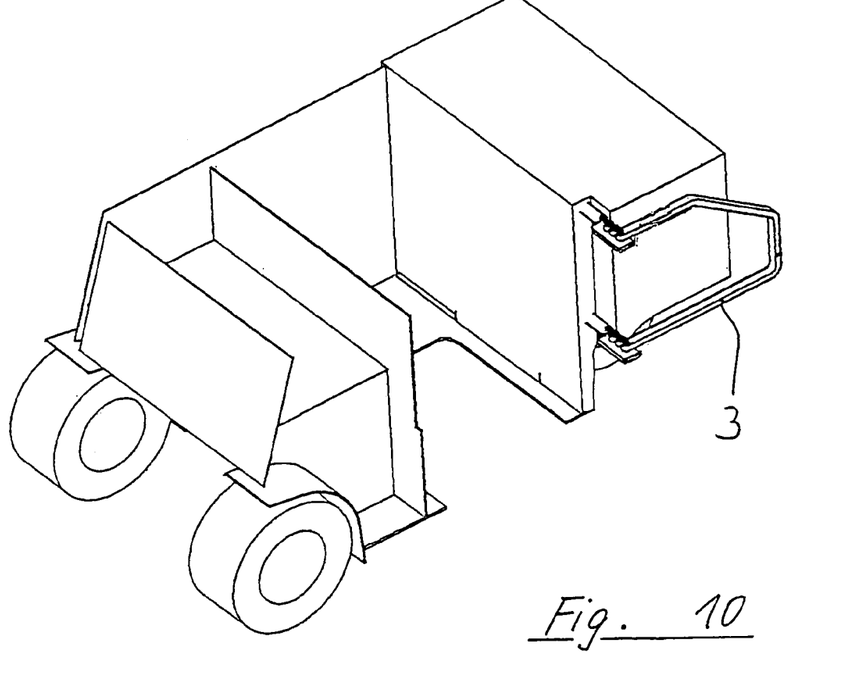
FIG. 10 shows a perspective view of an industrial truck of the invention, with a gear unit incorporated in the double hinge.
Figure 11:
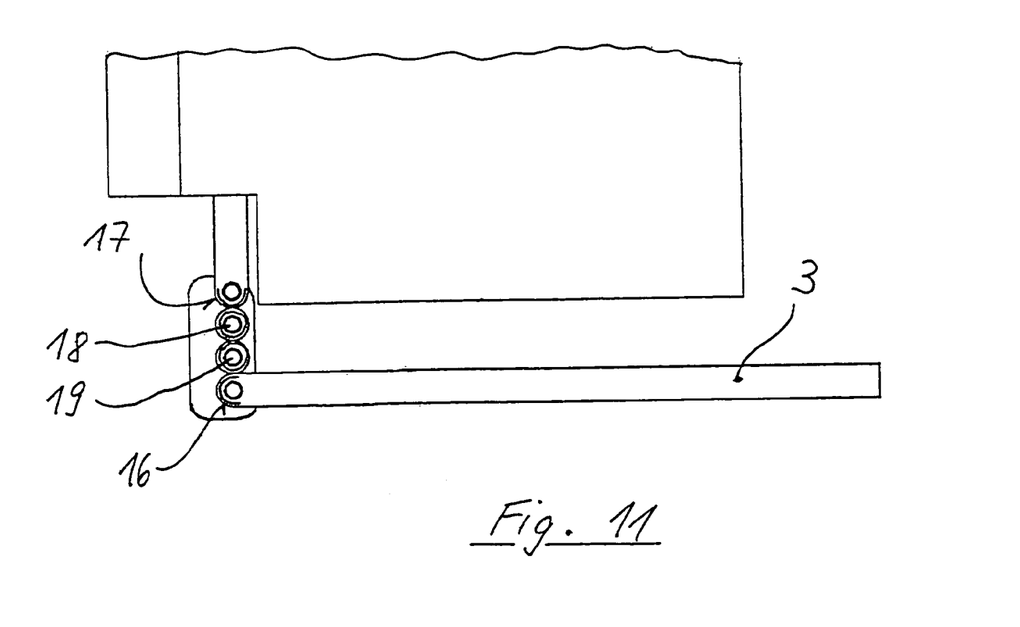
FIG. 11 shows a plan view of the gear unit according to FIG. 10.

The effect of gearing 16 on the door 3 and gearing 17 on the vehicle frame 1 (or on cantilevers attached thereto) and of an even-numbered quantity of gear wheels 18, 19 arranged therebetween cause coordinated pivoting movements of the door 3 about both axes of rotation A1 and A2. These pivoting movements, in contrast to the successive pivoting movements described above in conjunction with the cam control device and the locking rod, take place simultaneously. There is no need for a locking rod to prevent buckling.

Figure 12:
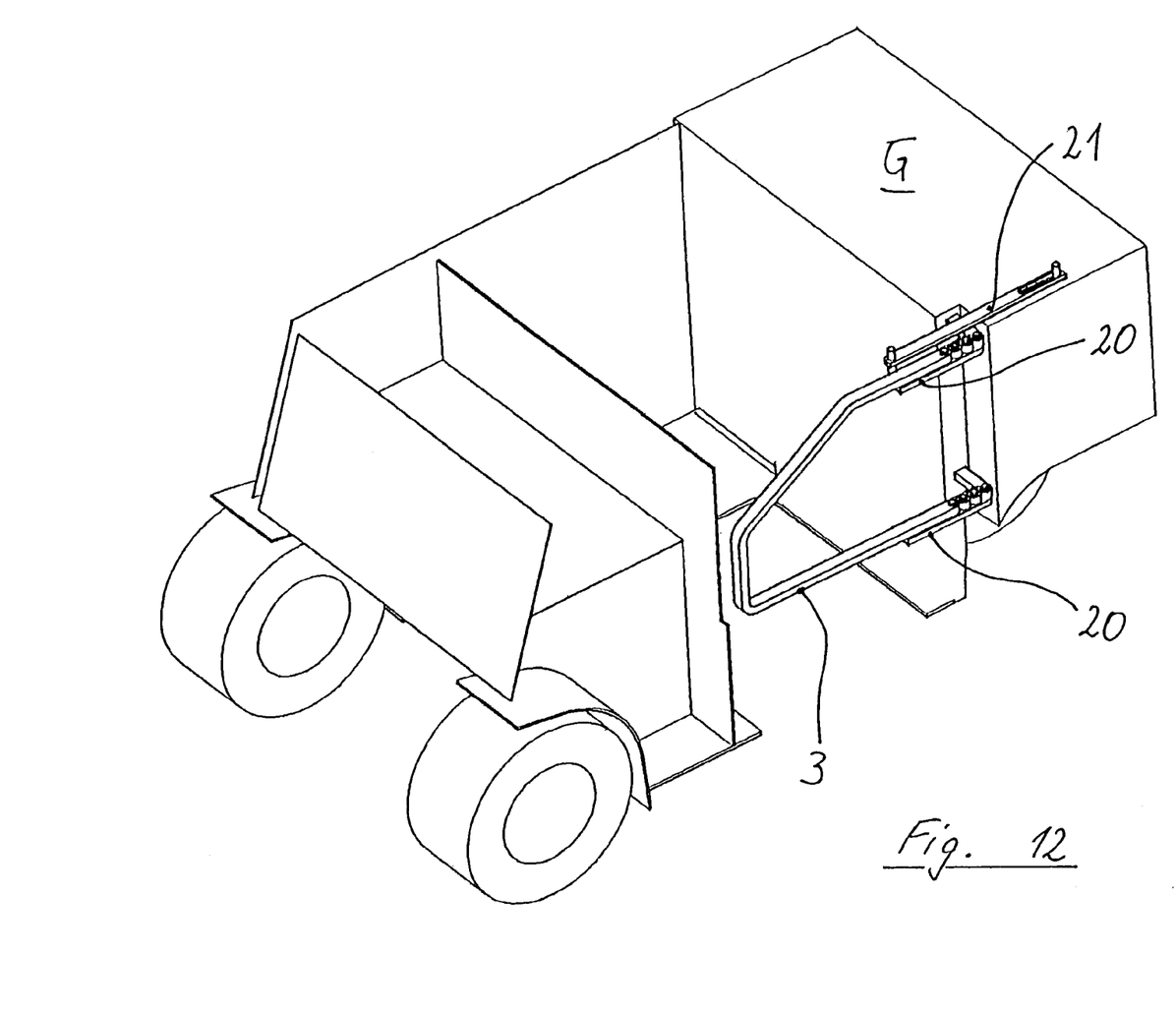
FIG. 12 shows a perspective view of an industrial truck of the invention, with a gear unit incorporated in the double hinge and a device for guiding the battery block.
Figure 13:
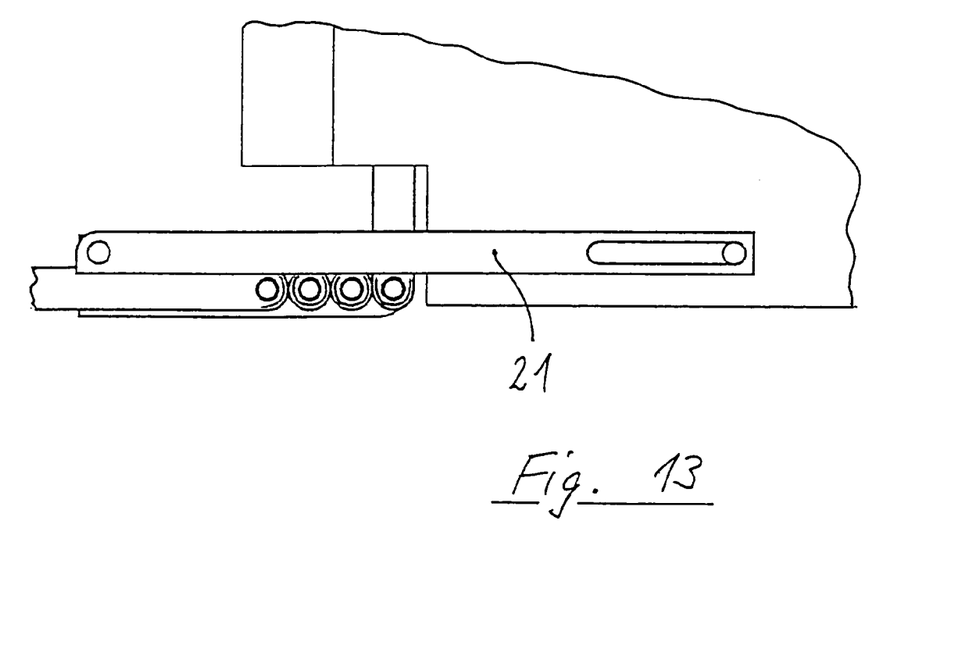
FIG. 13 shows a plan view of the gear unit and the guiding device according to FIG. 12, with the door in the closed position.
Figure 14:
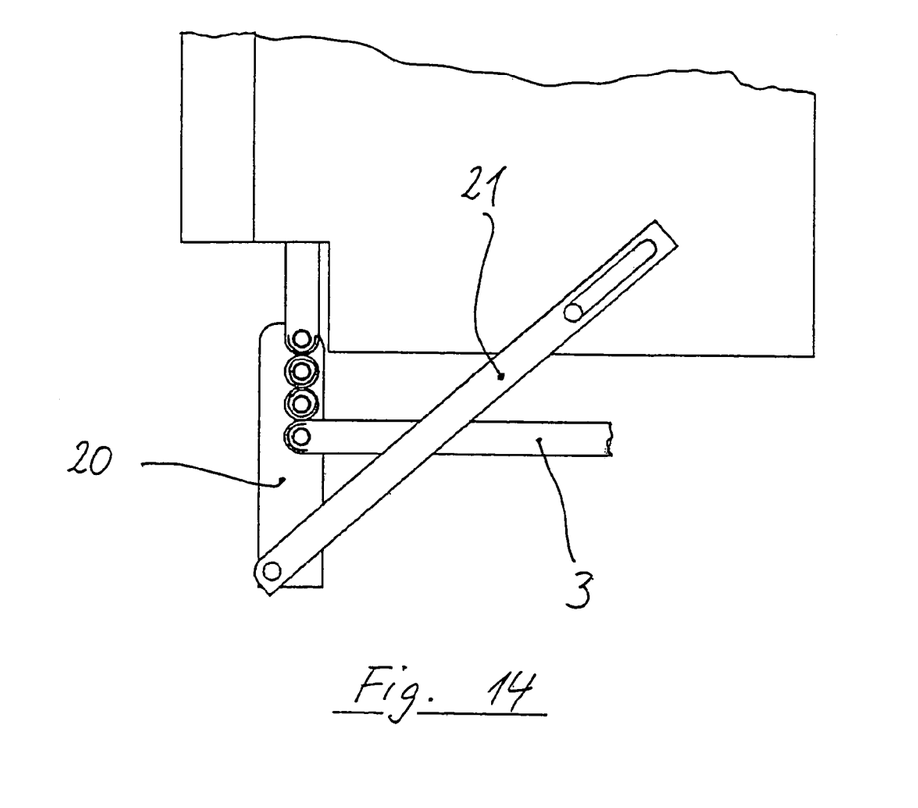
FIG. 14 shows a plan view of the gear unit and the guiding device according to FIG. 12, with the door in the open position.

In the embodiment according to FIGS. 12 to 14, not only the gear unit shown in FIGS. 10 and 11 but also a rod-shaped device 20 (FIGS. 12 and 14) for guiding the battery block is incorporated into the double hinge 5, which device 20 is oriented at right angles to the lateral vehicle contour when the door 3 is in a 180° open position. The guiding device 20, which includes a rod attached to the upper end of the double hinge 5 and a rod attached to the lower end of the double hinge 5, can be substantially (200 mm, for example) shorter than a door protruding at right angles (90° open position), provided for guiding purposes, would be.

In the operating position, the guiding device 20 is supported by an articulated brace 21, which is attached in a pivoting manner to the vehicle frame 1 (or to the counterweight G), so that impacts of the battery block suspended from the loading gear are directed into the vehicle frame. The articulated brace 21 may also be configured to have a damping effect.

In all of the described variants, the door 3, together with the locking unit 4 and the double hinge 5, can be constructed so as to reinforce the frame. In this case, the described devices with which a defined course of motion is obtained when opening and closing the door 3, such as the locking rod 10, for example, can serve to prevent the double hinge 5 from buckling.

Figure 1:
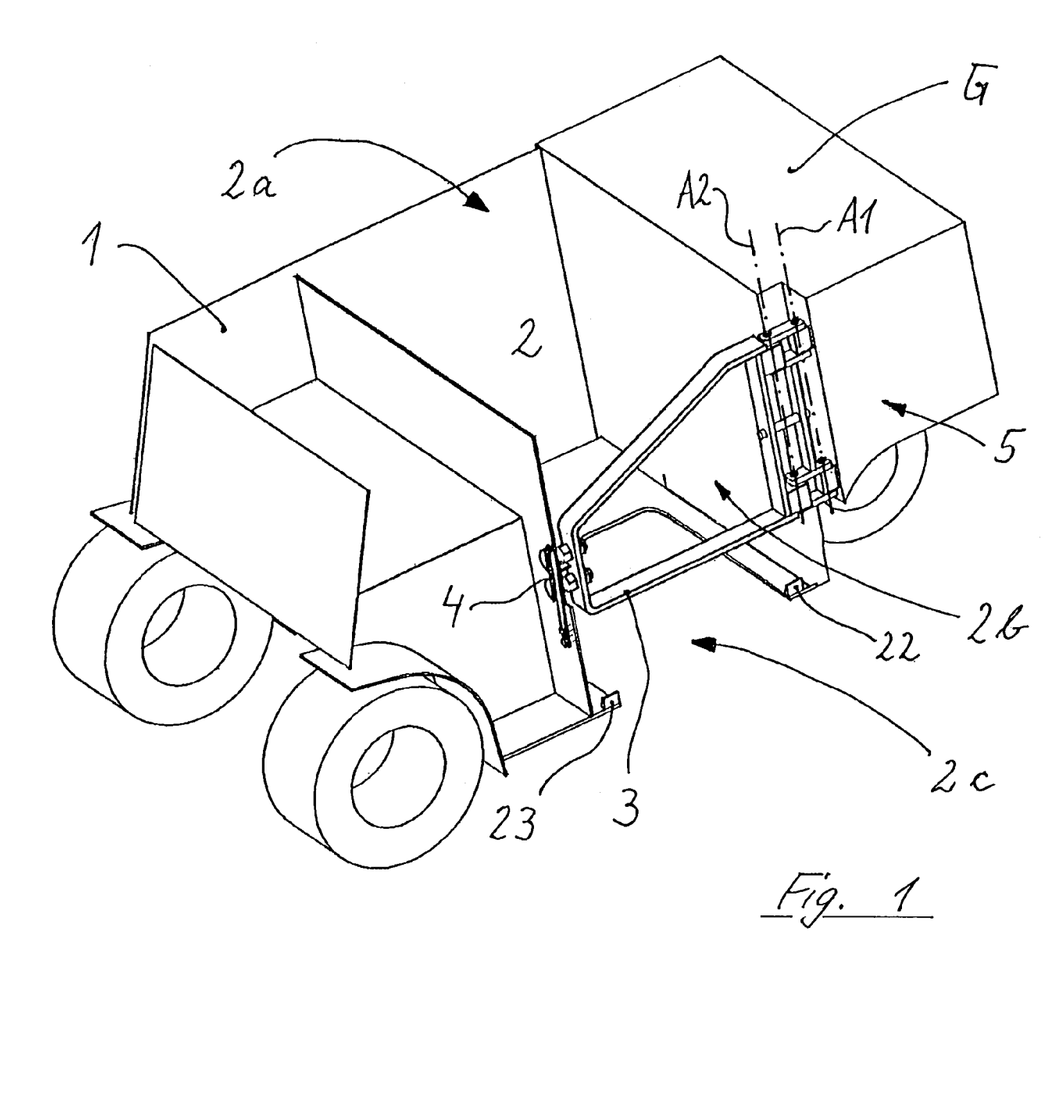
FIG. 1 shows a perspective view of an industrial truck of the invention, with the door in the closed position.

In order to prevent the door 3, the locking unit 4 and the double hinge 5 from being subjected, in the transverse direction, to inertial forces of the integrated battery block and possibly becoming damaged, delimiters 22, 23 can be arranged in the base region of the vehicle frame 1 (see FIG. 1, for example).

It will be readily appreciated by those skilled in the art that modifications may be made to the invention without departing from the concepts disclosed in the foregoing description. Accordingly, the particular embodiments described in detail herein are illustrative only and are not limiting to the scope of the invention, which is to be given the full breadth of the appended claims and any and all equivalents thereof.

What is claimed is:

1. An industrial truck, comprising:
   a vehicle frame comprising a frame portion with a lateral frame opening configured for receiving a battery block; and
   a door for covering the frame opening, the door pivotable outwardly about a substantially vertical axis of rotation,
   wherein the door is connected to the vehicle frame by a double hinge having first and second axes of rotation, with the second axis of rotation being set apart and parallel to the first axis of rotation and being alterable in its position when the door pivots about the first axis of rotation,
   wherein the first axis of rotation is arranged within a vehicle contour, wherein the door pivots about the first axis of rotation up to a first open position that is approximately at a right angle to a closed position, and wherein the door pivots around the second axis of rotation located outside the vehicle contour from the first open position to a second open position in which the door is at an angle approximately parallel with respect to the closed positions,
   wherein the double hinge includes an upper hinge element and a lower hinge element, each comprising an outer hinge frame, an inner hinge frame, a first hinge pin, and a second hinge pin, and
   wherein the first axis of rotation extends through the first hinge pin of the upper hinge element and the lower hinge element and the second axis of rotation extends through the second hinge pin of the upper hinge element and the lower hinge element.

2. The industrial truck according to claim 1, including means for obstructing a rotational motion of the door about the second axis of rotation, which means are active in a pivoting range between a closed position and the first open position that is approximately at the right angle to the closed position.

3. The industrial truck according to claim 2, wherein the means for obstructing the rotational motion about the second axis of rotation comprise a locking rod, by means of which a rigid connection is made between the door and a portion of the double hinge that is delimited by the two axes of rotation, and wherein the locking rod penetrates a vertical brace of the door in a horizontal direction and a vertical brace which connects the inner hinge frame of the upper and lower hinge elements.

4. The industrial truck according to claim 1, wherein the door and the double hinge are constructed so as to reinforce the frame and can be locked in the closed position by a force-transmitting locking unit.

5. The industrial truck according to claim 1, wherein viewed in a direction of travel, the door is attached to a back of the vehicle frame.

6. The industrial truck according to claim 1, including delimiters for locking a battery block in a lateral direction on the vehicle frame.

* * * * *